US010518899B2

(12) United States Patent
Jha et al.

(10) Patent No.: US 10,518,899 B2
(45) Date of Patent: Dec. 31, 2019

(54) AIRCRAFT HEAD LIGHT

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/680,276

(22) Filed: Aug. 18, 2017

(65) Prior Publication Data
US 2018/0050819 A1    Feb. 22, 2018

(30) Foreign Application Priority Data

Aug. 19, 2016   (EP) ..................................... 16184925

(51) Int. Cl.
*B64D 47/02* (2006.01)
*F21V 1/20* (2006.01)
(Continued)

(52) U.S. Cl.
CPC ............ *B64D 47/04* (2013.01); *F21S 41/143* (2018.01); *F21S 41/153* (2018.01); *F21S 41/255* (2018.01);
(Continued)

(58) Field of Classification Search
CPC . F21K 9/233; F21K 9/60; F21V 29/83; F21V 19/003; F21V 23/0414; F21V 5/04;
(Continued)

(56) References Cited

U.S. PATENT DOCUMENTS 7,029,148 B2   4/2006   White et al.
8,905,592 B2   12/2014  Scruggs et al.
(Continued)

FOREIGN PATENT DOCUMENTS

DE   102009023268 A1   6/2010
EP        1995514 A2   11/2008
(Continued)

OTHER PUBLICATIONS

Extended European Search Report for International Application No. 16184925.2 dated Feb. 24, 2017, 6 pages.

*Primary Examiner* — Thien T Mai
(74) *Attorney, Agent, or Firm* — Cantor Colburn LLP

(57) ABSTRACT

An aircraft head light comprises: a plurality of lighting arrangements, each lighting arrangement comprising a light source and a generally parabolic reflector surrounding the respective light source. The plurality of lighting arrangements are arranged in a side-by-side relationship, with the generally parabolic reflectors of adjacent lighting arrangements having respective reflector contact sections. For at least one adjacent pair of the plurality of lighting arrangements, said adjacent pair comprising a first lighting arrangement and a second lighting arrangement the reflector contact section of the generally parabolic reflector of the first lighting arrangement is parabolic and the reflector contact section of the generally parabolic reflector of the second lighting arrangement is non-parabolic.

12 Claims, 6 Drawing Sheets

(51) Int. Cl.

| | | |
|---|---|---|
| *F21V 21/00* | (2006.01) | |
| *B64F 1/20* | (2006.01) | |
| *B64D 47/04* | (2006.01) | |
| *F21V 5/04* | (2006.01) | |
| *F21V 7/06* | (2006.01) | |
| *F21V 13/04* | (2006.01) | |
| *F21V 21/005* | (2006.01) | |
| *F21S 41/143* | (2018.01) | |
| *F21S 41/255* | (2018.01) | |
| *F21S 41/32* | (2018.01) | |
| *F21S 41/33* | (2018.01) | |
| *F21S 41/153* | (2018.01) | |
| *F21Y 115/10* | (2016.01) | |

(52) U.S. Cl.
CPC ........... *F21S 41/321* (2018.01); *F21S 41/338* (2018.01); *F21V 5/04* (2013.01); *F21V 7/06* (2013.01); *F21V 13/04* (2013.01); *F21V 21/005* (2013.01); *F21Y 2115/10* (2016.08)

(58) Field of Classification Search
CPC .......... F21V 7/005; F21V 7/041; F21V 13/12; F21V 29/503; F21V 7/0083; F21V 7/043; F21V 9/08; F21V 13/02; F21V 15/01; F21V 19/004; F21V 29/763; F21V 29/77; F21V 7/00; F21V 7/0091; F21V 9/30; F21V 17/12; F21V 17/164; F21V 19/04; F21V 21/00; F21V 29/74; F21V 29/777; F21V 7/0033; F21V 13/08; F21V 13/14; F21V 14/04; F21V 14/06; F21Y 2115/10; F21Y 2107/30; F21Y 2107/40; F21Y 2101/00; F21Y 2103/10; F21Y 2105/10; F21Y 2103/00; F21Y 2113/00; F21Y 2115/30; F21Y 2103/30; F21Y 2113/10; F21Y 2113/13; F21Y 2103/33; F21S 41/36; F21S 43/195; F21S 45/47; F21S 41/24; F21S 41/365; F21S 43/30; F21S 4/20; F21S 4/28; F21S 41/336; F21S 41/37; F21S 43/31; F21S 4/22; F21S 8/043; F21S 11/002; F21S 41/14; F21S 43/26; F21S 43/37; F21S 45/10; F21S 45/43; F21S 6/00; F21S 8/031; F21S 8/04; F21S 8/061; F21S 8/086; B64D 7/06; B64D 47/04; B64D 2203/00
See application file for complete search history.

(56) References Cited

U.S. PATENT DOCUMENTS

| | | | | |
|---|---|---|---|---|
| 2004/0095763 A1* | 5/2004 | Guerrieri | ................ | F21K 9/233 362/240 |
| 2007/0126905 A1* | 6/2007 | Kobayashi | ............. | H04N 5/335 348/311 |
| 2008/0291680 A1* | 11/2008 | Wilcox | ..................... | F21V 7/06 362/297 |
| 2010/0171854 A1* | 7/2010 | Yokogawa | ........... | H04N 5/2254 348/294 |

FOREIGN PATENT DOCUMENTS

| | | |
|---|---|---|
| EP | 3040282 A1 | 7/2016 |
| JP | 2008159562 A | 7/2008 |

* cited by examiner

AIRCRAFT HEAD LIGHT

FOREIGN PRIORITY

This application claims priority to European Patent Application No. 16184925.2 filed Aug. 19, 2016, the entire contents of which is incorporated herein by reference.

TECHNICAL FIELD

The present invention is in the field of aircraft head lights. In particular, the present invention is in the field of exterior aircraft light units for illuminating an area in front of the aircraft, such as helicopter search lights or airplane landing lights.

BACKGROUND

Aircraft head lights, as they are employed in airplanes and helicopters, may comprise a plurality of lighting arrangements, each of said lighting arrangements comprising a reflector, in particular a reflector having a parabolic shape. With the parabolic reflectors, a strong collimation of light is achieved for providing a bright illumination in a desired direction. In order to use the available space efficiently, the lighting arrangements are arranged very closely to each other. A very close arrangement of the lighting arrangements results in an overlapping of the reflectors of adjacent lighting arrangements. In consequence, the shape of the reflectors needs to be modified so that they deviate from the parabolic shape in sections in which at least two adjacent reflectors contact each other (reflector contact sections). Deviations from the parabolic shape result in the generation of undesired stray light.

It therefore would be beneficial to provide an improved aircraft head light comprising a plurality of lighting arrangements which reduces the problem of stray light, but which still allows for a dense packing of the lighting arrangements.

SUMMARY

Exemplary embodiments of the invention include an aircraft head light which comprises: a plurality of lighting arrangements, each lighting arrangement comprising a light source and a generally parabolic reflector surrounding the respective light source. The plurality of lighting arrangements are arranged in a side-by-side relationship, with the generally parabolic reflectors of adjacent lighting arrangements having respective reflector contact sections. For at least one adjacent pair of the plurality of lighting arrangements, said adjacent pair comprising a first lighting arrangement and a second lighting arrangement, the reflector contact section of the generally parabolic reflector of the first lighting arrangement is parabolic and the reflector contact section of the generally parabolic reflector of the second lighting arrangement is non-parabolic.

The reflector contact section is defined as that portion of the two reflectors where the densely packed side-by-side arrangement of the reflectors does not allow to maintain the parabolic shape of both reflectors.

"Generally parabolic" is to be understood as mainly parabolic, i.e. mostly consisting of a parabolic or near parabolic shape, which is parabolic or nearly parabolic everywhere except for reflector contact sections in which the reflector is in contact with an adjacent reflector. The generally parabolic reflector has a generally collimating effect on the light emitted from the respective light source.

The parabolic reflector contact section is understood as being parabolic, light collimating, and concave, when seen from the light source. In this way, the parabolic reflector contact section forms a continuous, regular part of the generally parabolic reflector, contributing to the light collimating action thereof. The parabolic shape of the reflector is maintained in the parabolic reflector contact section. In contrast thereto, the non-parabolic reflector contact section is understood as being a reflector contact section that is not a concave parabolic structure with light collimating effect. The non-parabolic reflector contact section is not a continuous, regular part of the generally parabolic reflector. The non-parabolic reflector contact section is a portion of the generally parabolic reflector that is altered, as compared to the generally parabolic shape of the reflector, to accommodate the shape of the parabolic reflector contact section of the adjacent reflector. The non-parabolic reflector contact section is a portion of the generally parabolic reflector that is modified as compared to a fully parabolic reflector.

Accordingly, exemplary embodiments of the invention may also be described as including an aircraft head light which comprises: a plurality of lighting arrangements, each lighting arrangement comprising a light source and a generally parabolic reflector surrounding the respective light source. The plurality of lighting arrangements are arranged in a side-by-side relationship, with the generally parabolic reflectors of adjacent lighting arrangements having respective reflector contact sections. For at least one adjacent pair of the plurality of lighting arrangements, said adjacent pair comprising a first lighting arrangement and a second lighting arrangement, the shape of the generally parabolic reflector of the first lighting arrangement is maintained as parabolic in the reflector contact section and the shape of the generally parabolic reflector of the second lighting arrangement is altered in the reflector contact section to accommodate the parabolic shape of the reflector contact section of the generally parabolic reflector of the first lighting arrangement.

A configuration according to an exemplary embodiment of the invention allows for a dense packing of the lighting arrangements by modifying the reflector contact section of one of the reflectors in each pair of lighting arrangements. As a result, the generation of stray light is limited to only one lighting arrangement of each pair of lighting arrangements, namely to the second lighting arrangement comprising the reflector with the non-parabolic reflector contact section. By an appropriate spatial arrangement of the lighting arrangements, the direction into which the stray light is emitted, may be adjusted. In this way, the generation of stray light in particularly undesired directions may be reduced or eliminated, while maintaining a dense packing of the lighting arrangements. The direction(s) of stray light reduction or elimination may be chosen in accordance with any suitable design goal. It is in particular possible to arrange the lighting arrangements in an orientation in which no, or only a small amount of stray light is emitted into the upper hemisphere. As a result, blinding the pilot by stray light, which is reflected by clouds or fog located in front or above the aircraft, is reliably avoided. In this way, a deterioration of the pilot's view due to reflected stray light can be reduced, increasing the operating safety of the aircraft.

According to a further embodiment, for multiple adjacent pairs of the plurality of lighting arrangements provided in the aircraft head light, each of said multiple adjacent pairs comprising a respective first lighting arrangement and a respective second lighting arrangement, the respective reflector contact sections of the generally parabolic reflectors of the respective first lighting arrangements are parabolic and the respective reflector contact sections of the generally parabolic reflectors of the second lighting arrangements are non-parabolic. Such a configuration of multiple pairs of lighting arrangements with respective parabolic and non-parabolic reflector contact sections allows a particularly effective directing/shaping of stray light generated in an aircraft headlight comprising a plurality of densely packed lighting arrangements. In particular, undesired stray light in one or more particular directions may be particularly effectively reduced or eliminated. In such a configuration, a lighting arrangement, which is a first lighting arrangement of a particular pair of lighting arrangements may be a second lighting arrangement of another pair of lighting arrangements. In other words, one lighting arrangement may have a parabolic reflector contact section in the border region with one adjacent lighting arrangement and may have a non-parabolic reflector contact section in the border region with another adjacent lighting arrangement.

According to a further embodiment, each of the generally parabolic reflectors of the plurality of lighting arrangements has a center axis and the respective center axes of the generally parabolic reflectors of the plurality of lighting arrangements are oriented substantially parallel. Such a configuration provides an aircraft headlight generating a high intensity light beam in a direction which is parallel to the axes of the generally parabolic reflectors.

According to a further embodiment, for said at least one adjacent pair of the plurality of lighting arrangements, the reflector contact section of the generally parabolic reflector of the second lighting arrangement extends along a straight line parallel to the center axis of the reflector. While being straight in one dimension, the reflector contact section may be straight or curved in another dimension. In the former case, the reflector contact section of the generally parabolic reflector of the second lighting arrangement may be planar. In the latter case, the reflector contact section of the generally parabolic reflector of the second lighting arrangement may be formed cylindrically around the center axis of the generally parabolic reflector of the first lighting arrangement. It may also be formed cylindrically around the center axis of the generally parabolic reflector of the second lighting arrangement. By providing a particular geometry for the non-parabolic reflector contact section(s), the stray light may be adjusted in a desired manner.

According to a further embodiment, for said at least one adjacent pair of the plurality of lighting arrangements, the reflector contact section of the generally parabolic reflector of the second lighting arrangement has a convex shape, when seen from the light source of the second lighting arrangement. In particular, the reflector contact section of the generally parabolic reflector of the second lighting arrangement may be convex in two dimensions. In this way, the convex shape of the non-parabolic reflector contact section, when seen from the light source of the second lighting arrangement, may closely resemble the concave parabolic shape of the parabolic reflector contact section, when seen from the light source of the first lighting arrangement, resulting in a low amount of material needed for implementing the reflector contact section.

According to a further embodiment, a light emission plane is oriented substantially orthogonal to the center axes of the generally parabolic reflectors of the plurality of lighting arrangements. The light emission plane has a first side and a second side, wherein the first lighting arrangement is arranged closer to the first side then the second lighting arrangement. In this way, the given pair of lighting arrangements generates more stray light towards the second side than towards the first side of the light emission plane. In a configuration, in which there are multiple pairs of lighting arrangements, all first lighting arrangements may be located closer to the first side than to the second side of light emission plane. In such a configuration, the emission of stray light towards the first side is greatly reduced. By an appropriate orientation of the lighting arrangements, the emission of stray light into a selected direction, e.g. in the upper direction, may be considerably reduced.

According to a further embodiment, the first side is an upper side of the aircraft head light and the second side is a lower side of the aircraft head light. As a result, the emission of stray light into the upper direction (upper hemisphere) is considerably reduced. Stray light, which is reflected into the upper hemisphere, is very prone for being reflected by clouds or fog, which may result in blinding the pilot or at least deteriorating his view. Thus, reducing the emission of stray light into the upper hemisphere considerably enhances the pilot's viewing conditions and in consequence enhances the safety of the aircraft. While reducing stray light in the upper hemisphere, stray light in the lower hemisphere may be increased. This increase in stray light in the lower hemisphere is not perceived as disturbing by the pilot. In particular, the likelihood of stray light in the lower hemisphere being reflected by clouds or fog for disturbing the pilot is low. Also, stray light in the lower hemisphere may even enhance the pilot's view, because stray light outside of the highly illuminated ground area in the main light beam direction gives the pilot a sense of height of the aircraft.

According to a further embodiment, the plurality of lighting arrangements are arranged in a honeycomb structure. A honeycomb structure allows for a very dense packing of the lighting arrangements. This allows for providing an effective aircraft head light which needs only a small amount of space.

According to a further embodiment, the plurality of lighting arrangements consists of seven lighting arrangements, which are arranged in three rows. The plurality of lighting arrangements in particular comprises two first row lighting arrangements, two second row outer lighting arrangements, one second row center lighting arrangement, which is sandwiched between the two second row outer lighting arrangements, and two third row lighting arrangements. Such a structure provides a very efficient and dense configuration of lighting arrangements.

According to a further embodiment, for the adjacent pairs of first row lighting arrangements and second row outer lighting arrangements, the respective reflector contact sections of the generally parabolic reflectors of each of the two first row lighting arrangements are parabolic and the respective reflector contact sections of the generally parabolic reflectors of each of the two second row outer lighting arrangements are non-parabolic.

According to a further embodiment, for the adjacent pairs of first row lighting arrangements and second row center lighting arrangement, the respective reflector contact sections of the generally parabolic reflectors of each of the two first row lighting arrangements are parabolic and the respective reflector contact sections of the generally parabolic reflector of the second row center lighting arrangement are non-parabolic.

According to a further embodiment, for the adjacent pairs of second row outer lighting arrangements and third row lighting arrangements, the respective reflector contact sections of the generally parabolic reflectors of each of the two second row outer lighting arrangements are parabolic and the respective reflector contact sections of the generally parabolic reflectors of each of the two third row lighting arrangements are non-parabolic.

According to a further embodiment, for the adjacent pairs of third row lighting arrangements and second row center lighting arrangement, the respective reflector contact sections of the generally parabolic reflector of the second row center lighting arrangement are parabolic and the respective reflector contact sections of the generally parabolic reflectors of each of the two third row lighting arrangements are non-parabolic.

The features mentioned in the previous four paragraphs may be realized individually or in any combination of the features of two or more of these paragraphs.

According to a further embodiment, the reflector contact sections between two adjacent lighting arrangements, in particular between two adjacent lighting arrangements which are located in the same row, may be either straight for both lighting arrangements or cut out. This allows a dense and symmetric packing along the horizontal direction, i.e. along the rows of adjacent lighting arrangements.

According to a further embodiment, each of the light sources of the plurality of lighting arrangements comprises at least one LED. LEDs provide efficient, long-living light sources at low costs.

According to a further embodiment, each of the plurality of lighting arrangements comprises a lens, wherein the generally parabolic reflector is arranged around the lens. Providing a lens within the parabolic reflector allows to enhance the shape and orientation of the light beam, which is emitted by the lighting arrangement. In particular, the lens and the generally parabolic reflector may jointly provide for a highly effective collimation of the light emitted by the light source. Further in particular, the lens may collimate a first portion of the light emitted by the light source, and the generally parabolic reflector may collimate a second portion of the light emitted by the light source.

According to a further embodiment, the aircraft head light is configured for illuminating an area in front of and/or below the aircraft. According to a further embodiment, the aircraft head light in particular is one of a helicopter search light, an airplane landing light, an airplane taxi light, an airplane runway turnoff light, and an airplane take-off light. This allows to provide densely packed helicopter search lights, airplane landing lights, airplane taxi lights, airplane runway turnoff lights, and airplane take-off lights generating a reduced amount of undesired stray light, respectively.

Exemplary embodiments of the invention also include a rotorcraft comprising an aircraft head light according to exemplary embodiments of the invention. The rotorcraft may in particular be a helicopter and/or an unmanned aerial vehicle ("drone"). The aircraft head light may be attached to an outside structure of the rotorcraft or included into the body of the rotorcraft. The additional features, modifications and effects, described above with respect to the aircraft head light, apply to the rotorcraft in an analogous manner.

Exemplary embodiments of the invention further include an airplane comprising an aircraft head light according to exemplary embodiments of the invention. The aircraft head light may be attached to an outside structure of the airplane or included into the fuselage or a wing of the airplane. The additional features, modifications and effects, described above with respect to the aircraft head light, apply to the airplane in an analogous manner.

BRIEF DESCRIPTION OF THE DRAWINGS

Further exemplary embodiments of the invention are described in the following with respect to the accompanying drawings.

DETAILED DESCRIPTION

Figure 1A:
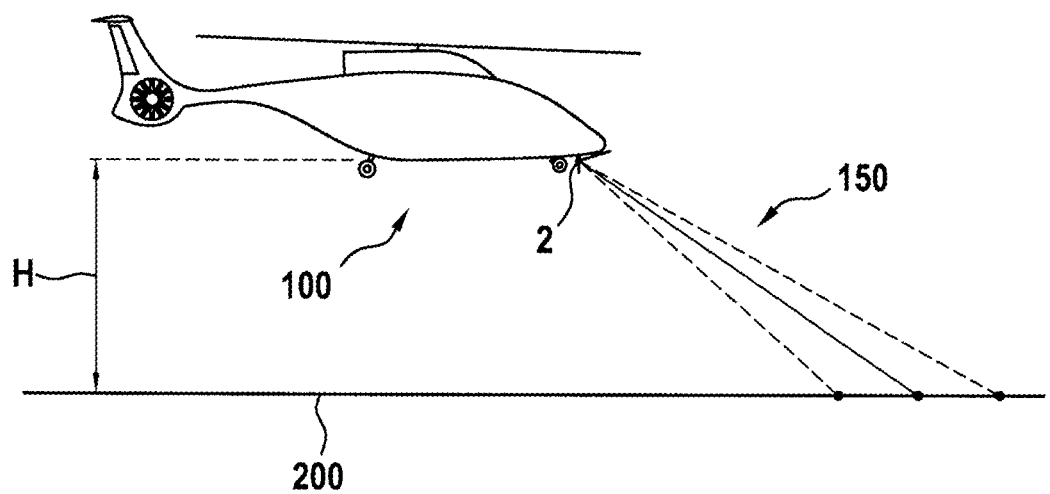
FIG. 1a depicts a rotorcraft/helicopter which is equipped with an aircraft head light according to an exemplary embodiment of the invention.

FIG. 1a shows a rotorcraft, in particular a helicopter, 100 flying at a height H above a ground 200. The rotorcraft 100 is equipped with an aircraft head light 2 mounted to a front bottom portion of the rotorcraft 100 and generating a light beam 150, which is directed downwards in front of the rotorcraft 100. For generating the light beam 150, the aircraft head light 2 may comprise a plurality of lighting arrangements, which are not shown in FIG. 1a.

Figure 1B:
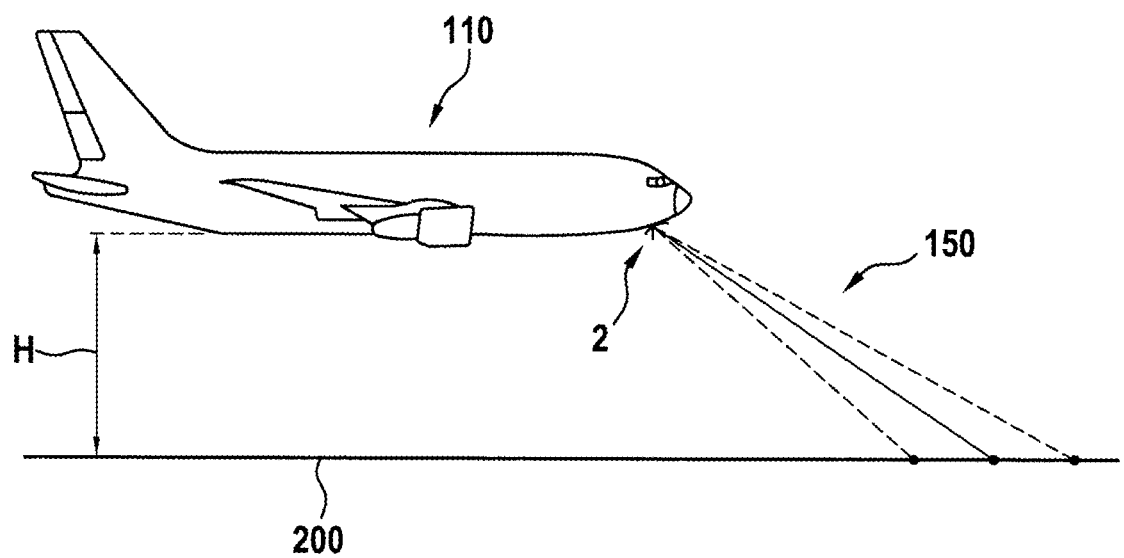
FIG. 1b depicts an airplane which is equipped with an aircraft head light according to an exemplary embodiment of the invention.

FIG. 1b shows a airplane 110, flying at a height H above the ground 200. The airplane 110 is equipped with an aircraft head light 2 mounted to a front bottom portion of the airplane 110 and generating a light beam 150 which is directed downwards in front of the airplane 110. For generating the light beam 150, the aircraft head light 2 may comprise a plurality of lighting arrangements, which are not shown in FIG. 1b.

Figure 2:
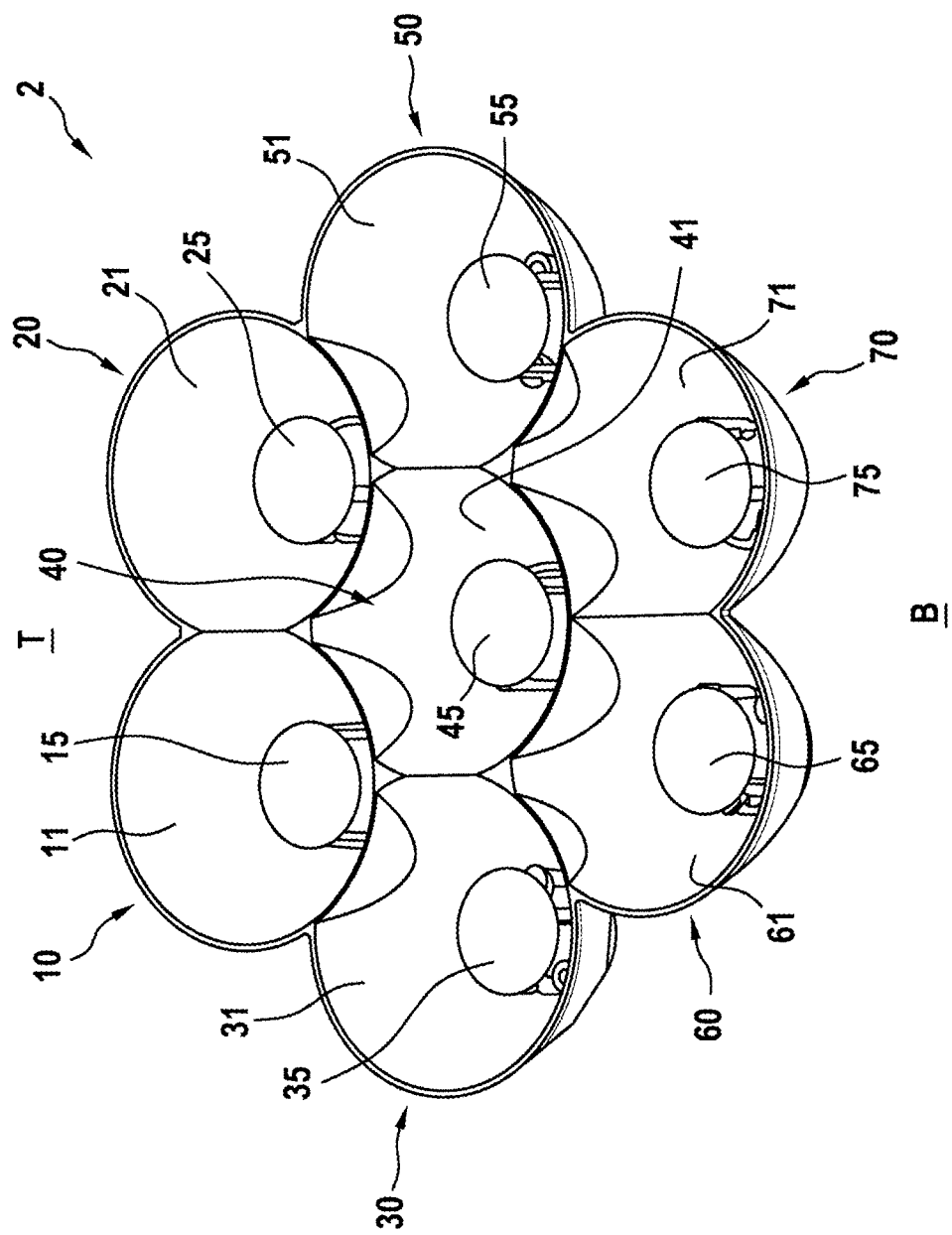
FIG. 2 depicts a perspective view of seven lighting arrangements of an aircraft head light according to an exemplary embodiment of the invention.
Figure 3:
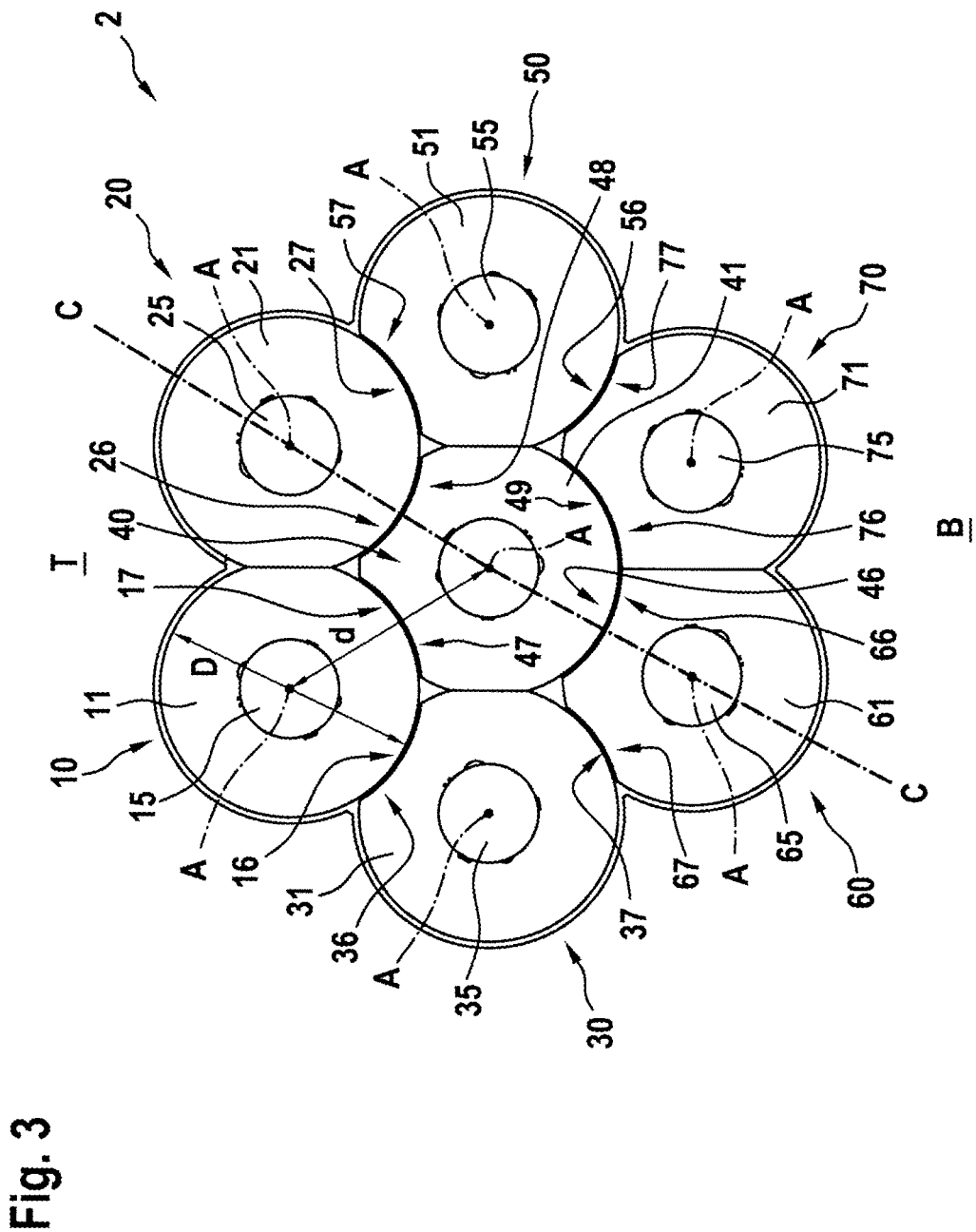
FIG. 3 depicts a plan view of the lighting arrangements shown in FIG. 2.
Figure 4A:
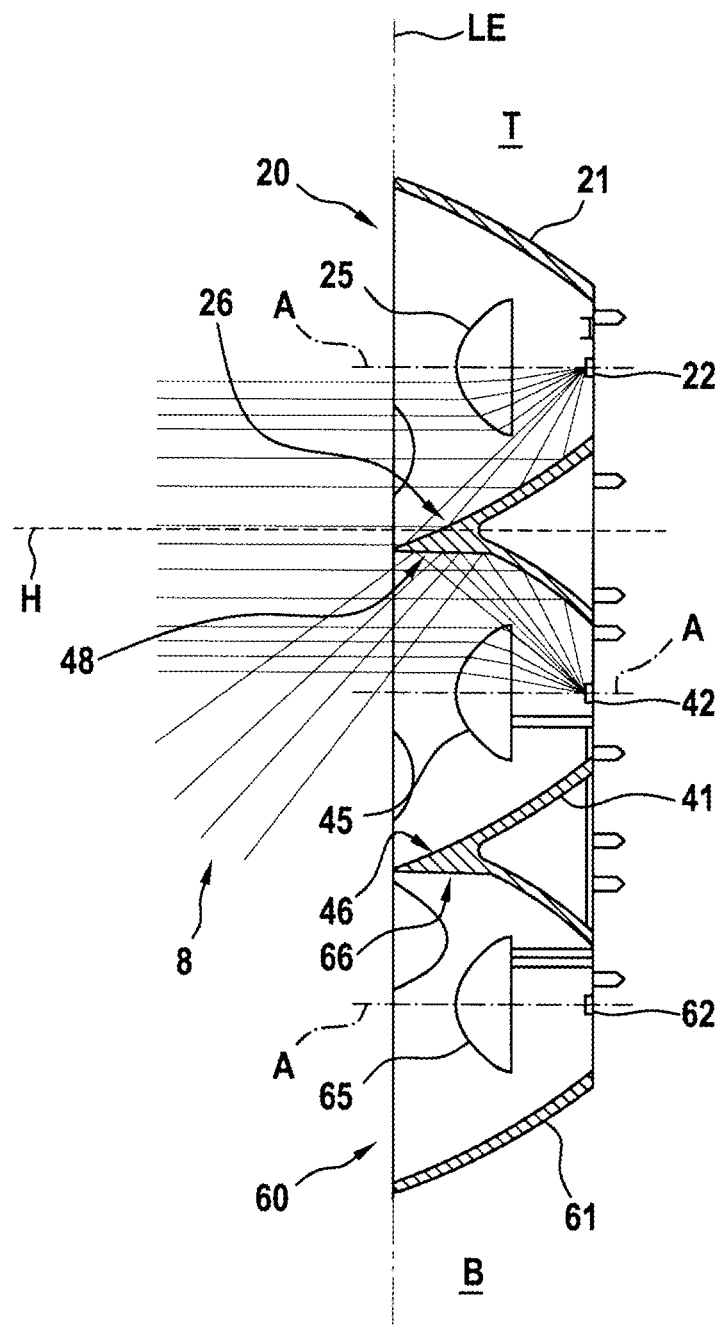
FIG. 4a depicts a sectional view of a first embodiment along line C-C of FIG. 3.
Figure 4B:
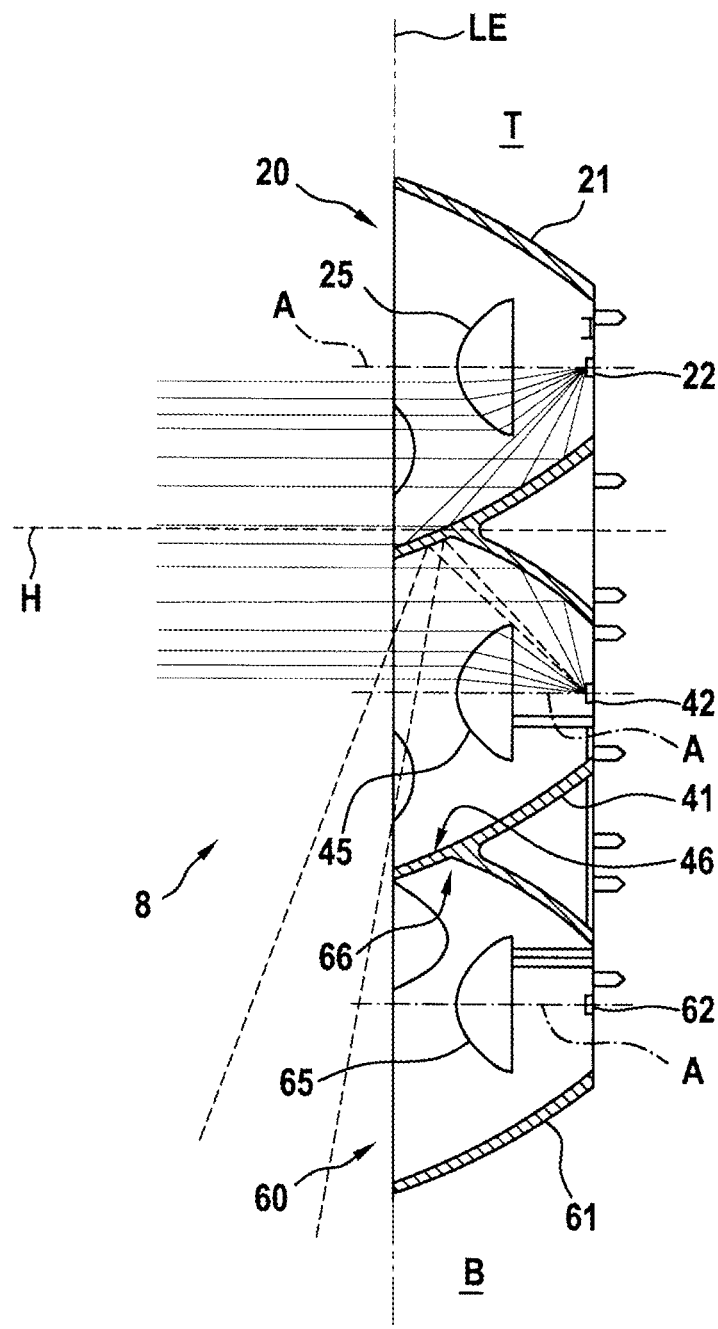
FIG. 4b depicts a sectional view of a second embodiment along line C-C of FIG. 3.

FIG. 2 shows a perspective view of seven lighting arrangements 10, 20, 30, 40, 50, 60, 70 forming an aircraft head light 2 according to an exemplary embodiment of the invention. FIG. 3 shows a plan view thereof, and FIGS. 4a and 4b show a sectional view of two different embodiments, each sectional view being oriented along line C-C depicted in FIG. 3.

Each of the seven lighting arrangements 10, 20, 30, 40, 50, 60, 70 comprises a light source. The light sources are not visible in the perspective and top views of FIGS. 2 and 3. However, three light sources 22, 42, 62 are depicted in FIGS. 4a and 4b. Each of the seven lighting arrangements 10, 20, 30, 40, 50, 60, 70 further comprises a reflector 11, 21, 31, 41, 51, 61, 71 surrounding the respective light source, and a lens 15, 25, 35, 45, 55, 65, 75, which is arranged within the respective reflector 11, 21, 31, 41, 51, 61, 71 on top of the respective light source. Each reflector 11, 21, 31, 41, 51, 61, 71 has a generally parabolic shape, which is centered around a respective central axis A. The light sources and the lenses 15, 25, 35, 45, 55, 65, 75 are centered at the central axis A of each of the reflectors 11, 21, 31, 41, 51, 61, 71, respectively.

The reflectors 11, 21, 31, 41, 51, 61, 71 are open at a front side opposite to the light sources, and the front openings of all reflectors 11, 21, 31, 41, 51, 61, 71 have the same diameter D, when measured at opposing circular sections at the front side. The diameter D may be in the range from 2 to 7 cm, in particular in the range from 3 to 5 cm, more particularly, the diameter D may be about 4 cm. The overall combined extension of the front openings of the reflectors 11, 21, 31, 41, 51, 61, 71 may be in the range from 7 cm to 22 cm, in particular in the range from 10 cm to 17 cm, more in particular about 14 cm. Other overall combined extensions are possible as well, in particular depending on the number and arrangement of the lighting arrangements.

The light sources may comprise LEDs, in particular each light source may consist of exactly one LED. Alternative light sources 22, 42, 62 may be employed as well.

The lighting arrangements 10, 20, 30, 40, 50, 60, 70 are arranged in a densely packed honeycomb structure. In particular, the lighting arrangements are arranged in a honeycomb structure comprising a first row of two lighting arrangements 10, 20, also referred to as first row lighting arrangements 10, 20 (shown on top of FIGS. 2 and 3); a second row of three lighting arrangements 30, 40, 50, in particular two outer lighting arrangements 30, 50, also referred to as second row outer lighting arrangements 30, 50, and a center lighting arrangement 40, also referred to as second row center lighting arrangement 40, which is sandwiched between the two outer lighting arrangements 30, 50; and a third row of two lighting arrangements 60, 70, also referred to as third row lighting arrangements 60, 70 (shown at the bottom of FIGS. 2 and 3).

The lighting arrangements 10, 20, 30, 40, 50, 60, 70 are packed so densely that the distances d between the central axes A of adjacent reflectors 11, 21, 31, 41, 51, 61, 71 are smaller than the diameters D of the reflectors 11, 21, 31, 41, 51, 61, 71. In consequence, the parabolic shapes of adjacent reflectors 11, 21, 31, 41, 51, 61, 71, if not modified, would intersect with each other. Thus, the shape of at least one of every pair of adjacent reflectors 11, 21, 31, 41, 51, 61, 71 is modified in the sections 16, 17, 26, 27, 36, 37, 46, 47, 48, 49, 56, 57, 66, 67, 76, 77, in which two adjacent reflectors, if not modified, would intersect with each other. These sections are called "reflector contact sections" 16, 17, 26, 27, 36, 37, 46, 47, 48, 49, 56, 57, 66, 67, 76, 77.

According to the exemplary embodiment shown in FIGS. 2, 3, 4*a*, and 4*b*, the reflector contact section 26 of a first reflector 21, i.e. of a reflector 21 of a first lighting arrangement 20, of an exemplary pair of adjacent light arrangements 20, 40 has an overall parabolic shape, where as the shape of the reflector contact section 48 of a second reflector 41 of said pair of adjacent lighting arrangements 20, 40 is non-parabolic. In other words, the second reflector 41 is modified in the reflector contact section 48 as compared to an overall parabolic shape. The reflector contact section 48 of the second reflector 40 in particular is modified so that it allows the corresponding first reflector 20 to maintain its parabolic form in the reflector contact section 26.

The skilled person will understand from FIGS. 2 and 3 that the modification of the reflector contact section 48, as it has been described with respect to the exemplary pair of adjacent lighting arrangements 20, 40, is also applied to other pairs of adjacent lighting arrangements 10, 20, 30, 40, 50, 60, 70 shown in FIGS. 2 and 3. FIGS. 2, 3, 4*a*, and 4*b* in particular illustrate that a lighting arrangement 40, which is the lighting arrangement 40 of a first pair of lighting arrangements 20, 40 with a non-parabolic reflector contact section 48, at the same time is the lighting arrangement 40 of another pair of lighting arrangements 40, 60, where it has a parabolic reflector contact section 46.

The viewing plane of FIG. 3 is oriented parallel to a light emission plane LE, which is oriented orthogonal to the central axes A of the light arrangements 10, 20, 30, 40, 50, 60, 70 (see FIGS. 4*a* and 4*b*). The shapes of the reflectors 11, 21, 31, 41, 51, 61, 71 are such that the non-parabolic reflector contact sections 36, 47, 48, 57, 66, 67, 76, 77 of the reflectors 11, 21, 31, 41, 51 are closer to a lower side B of said light emission plane LE than the respectively adjacent parabolic reflector contact sections 16, 17, 26, 27, 37, 46, 49, 56 of the reflectors 11, 21, 31, 41, 51, 61, 71. In other words, in the embodiment shown in FIGS. 2 and 3, the reflector contact sections 36, 47, 48, 57, 66, 67, 76, 77 which are located closer to the lower side B of FIGS. 2 and 3 are non-parabolic, i.e. they are modified as compared to a hypothetical overall parabolic shape of the respective reflectors, whereas the reflector contact sections 16, 17, 26, 27, 37, 46, 49, 56 which are located closer to the upper side T of FIGS. 2 and 3 are parabolic, i.e. they are not modified as compared to the hypothetical overall parabolic shape of the respective reflectors.

More in particular: For the adjacent pairs of first row lighting arrangements 10, 20 and second row outer lighting arrangements 30, 50, the respective reflector contact sections 16, 27 of the generally parabolic reflectors 11, 21 of each of the two first row lighting arrangements 10, 20 are parabolic and the corresponding reflector contact sections 36, 57 of the generally parabolic reflectors 31, 51 of each of the two second row outer lighting arrangements 30, 50 are non-parabolic.

For the adjacent pairs of first row lighting arrangements 10, 20 and second row center lighting arrangement 40, the respective reflector contact sections 17, 26 of the generally parabolic reflectors 11, 21 of each of the two first row lighting arrangements 10, 20 are parabolic and the corresponding reflector contact sections 47, 48 of the generally parabolic reflector 41 of the second row center lighting arrangement 40 are non-parabolic.

For the adjacent pairs of second row outer lighting arrangements 30, 50 and third row lighting arrangements 60, 70, the respective reflector contact sections 37, 56 of the generally parabolic reflectors 31, 51 of each of the two second row outer lighting arrangements 30, 50 are parabolic and the corresponding reflector contact sections 67, 77 of the generally parabolic reflectors 61, 71 of each of the two third row lighting arrangements 60, 70 are non-parabolic.

For the adjacent pairs of third row lighting arrangements 60, 70 and second row center lighting arrangement 40, the respective reflector contact sections 46, 49 of the generally parabolic reflector 41 of the second row center lighting arrangement 40 are parabolic and the corresponding reflector contact sections 66, 76 of the generally parabolic reflectors 61, 71 of each of the two third row lighting arrangements 60, 70 are non-parabolic.

As a result, stray light 8, which is generated due to the non-parabolic shape of the reflector contact sections 36, 47, 48, 57, 66, 67, 76, 77, is reflected towards the second (lower) side B, and (almost) no stray light is reflected to the first (upper) side T (see FIGS. 4*a* and 4*b*).

In case aircraft head light 2 having the lighting arrangements 10, 20, 30, 40, 50, 60, 70 is mounted to an aircraft 100, 110 in the same orientation as it is shown in FIG. 3, i.e. with the first (upper) side T being the top side of the aircraft head light 2 when mounted to the aircraft 100, 110 (almost) no stray light is emitted upwardly, i.e. above a horizontal plane H. Instead, the stray light 8 is emitted only downwards, as it is shown in FIGS. 4*a* and 4*b*.

The reflector contact section 66 of the lowest reflector 61, as shown in FIG. 4*a*, is formed cylindrically with respect to the central axis A of the adjacent reflector 41, as can be seen also from the circular outline in FIG. 3. The reflector contact section 66 therefore is depicted as a horizontally extending straight line in the cross-sectional view of FIG. 4a.

The corresponding reflector contact section 46 of the adjacent reflector 41 has a parabolic shape. In other words, the reflector 41 has a parabolic shape all the way from the light source 42 to the opposing opening of the reflector 41.

In an alternative embodiment, as it is shown in FIG. 4b, the reflector contact section 66 of the lowest reflector 61 is formed by the back-side of the parabolic reflector contact section 46. In this way, the reflector contact section 66 is convex both in the top/bottom dimension and the front/back direction of the aircraft head light 2. This convex shape of the reflector contact section 66 has a diverging effect on the light from the light source 62, as is illustrated by stray light 8, drawn with dashed lines for the analogously shaped adjacent reflector 41. As the reflector contact section 66 has a non-collimating convex shape, when seen from the light source 62, it is non-parabolic in the sense of the present document. It is also possible that the reflector contact section 66 is planar, forming a straight line both in the cross-sectional view of FIG. 4 and the cross-sectional view of FIG. 3. The reflector contact section 46 of the adjacent reflector 41 has a parabolic shape as in the embodiment shown in FIG. 4a.

Figure 5A:
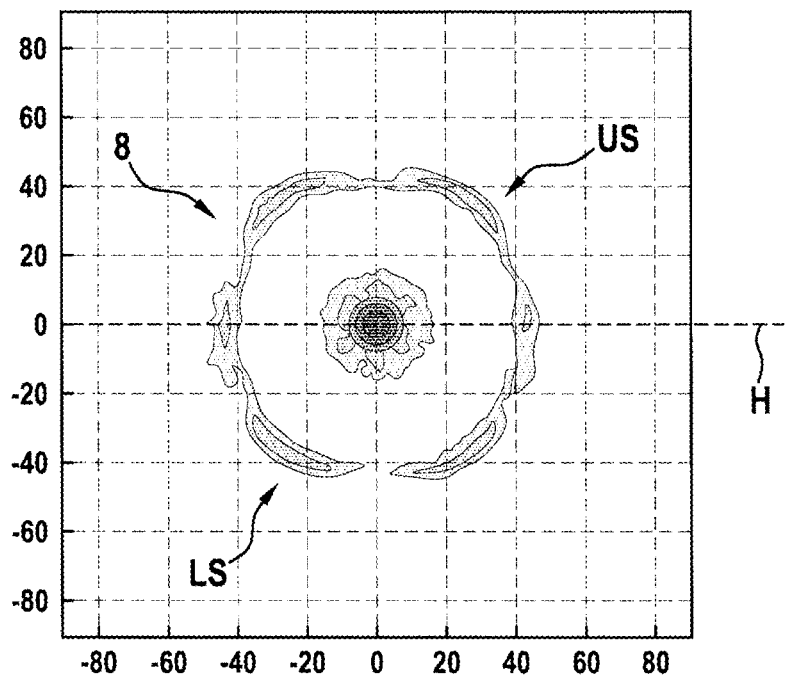
FIG. 5a illustrates the distribution of stray light generated by an aircraft head light comprising lighting arrangements with all reflector sections being non-parabolic.
Figure 5B:
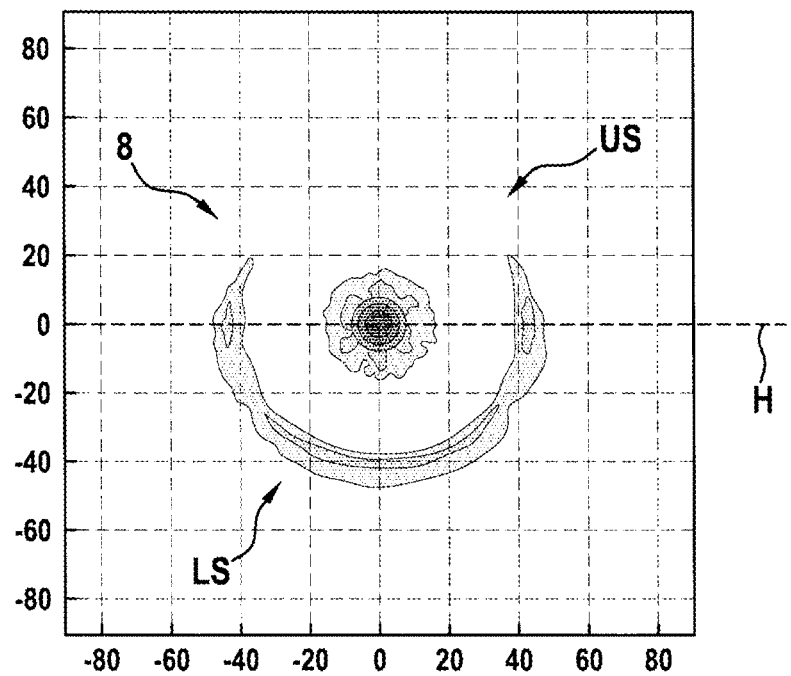
FIG. 5b illustrates the distribution of stray light generated by an aircraft head light comprising lighting arrangements according to an exemplary embodiment of the invention.

FIGS. 5a and 5b illustrate the effect of an aircraft head light 2 comprising lighting arrangements 10, 20, 30, 40, 50, 60, 70 according to exemplary embodiments of the invention.

FIG. 5a illustrates the distribution of stray light 8 generated by an aircraft headlight 2 comprising conventional lighting arrangements, i.e. lighting arrangements which have been modified in all reflector contact sections, i.e. on the upper side T as well as on the lower side B, for allowing a close packing of adjacent reflectors.

In such a configuration, the stray light 8 generated by the modifications of the reflectors, which result in a deviation from the parabolic shape in all reflector contact sections, is basically symmetrical with respect to the horizontal plane H, i.e. the amount of stray light reflected into the upper sphere US is basically identical to the amount of stray light reflected into the lower sphere LS. In particular, stray light reflected into the upper sphere US is undesirable as it may deteriorate the pilot's view in particular when it is reflected by clouds or fog.

FIG. 5b illustrates the distribution of stray light generated by an aircraft head light 2 comprising lighting arrangements 10, 20, 30, 40, 50, 60, 70 according to exemplary embodiments of the invention, i.e. lighting arrangements 10, 20, 30, 40, 50, 60, 70 in which the bottom sides of the reflectors 11, 21, 31, 41, 51, 61, 71 have not been modified but maintain their respective parabolic shapes.

As a result, the amount of stray light reflected into the upper sphere US, i.e. above the horizontal plane H, is considerably reduced (e.g. to 10% or less), while the amount of stray light in the lower sphere LS, i.e. below the horizontal plane H, is increased. The reduction of the amount of stray light in the upper sphere US considerably reduces the risk that the pilot is blinded by stray light 8 reflected by clouds or fog. The additional amount of stray light 8 reflected to the lower sphere LS is beneficial as it enhances the illumination of the ground 200 improving the pilot's vision of the runway/landing place.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft head light comprising:
   a plurality of lighting arrangements, each lighting arrangement comprising a light source and a generally parabolic reflector surrounding the respective light source,
   wherein the plurality of lighting arrangements are arranged in a side-by-side relationship, with the generally parabolic reflectors of adjacent lighting arrangements having respective reflector contact sections,
   wherein, for at least two adjacent pairs of the plurality of lighting arrangements, each of said at least two adjacent pairs comprising a first lighting arrangement and a second lighting arrangement, the reflector contact section of the generally parabolic reflector of the first lighting arrangement is parabolic and the reflector contact section of the generally parabolic reflector of the second lighting arrangement is non-parabolic;
   wherein each of the generally parabolic reflectors of the plurality of lighting arrangements has a center axis (A) and the respective center axes (A) of the generally parabolic reflectors of the plurality of lighting arrangements are oriented substantially parallel to each other;
   wherein the aircraft head light has a light emission plane (LE) which is oriented substantially orthogonally to the center axes (A) of the generally parabolic reflectors of the plurality of lighting arrangements, the light emission plane (LE) having a first side (T) and a second side (B) with the first and second sides (T, B) of the light emission plane (LE) being spaced apart from each other in a direction which is oriented substantially orthogonally to the center axes (A); and
   wherein, when the reflectors are projected onto the light emission plane (LE), for each of the at least two adjacent pairs, a projection of the reflector of the first lighting arrangement is closer to the first side (T) of the light emission plane (LE) than a projection of the reflector of the second lighting arrangement of the same pair.

2. The aircraft head light according to claim 1, wherein, for said at least one adjacent pair of the plurality of lighting arrangements, the reflector contact section of the generally parabolic reflector of the second lighting arrangement is planar.

3. The aircraft head light according to claim 1, wherein, for said at least one adjacent pair of the plurality of lighting arrangements, the reflector contact section of the generally parabolic reflector of the second lighting arrangement is convex, when seen from the light source of the second lighting arrangement.

4. The aircraft head light according to claim 1, wherein the first side (T) is an upper side of the aircraft head light and wherein the second side (B) is a lower side of the aircraft head light.

5. The aircraft head light according to claim 1, wherein the plurality of lighting arrangements are arranged in a honeycomb structure.

6. The aircraft head light according to claim 1, wherein the plurality of lighting arrangements comprises seven lighting arrangements, arranged in three rows, and wherein the plurality of lighting arrangements comprises two first row lighting arrangements, one second row center lighting arrangement, two second row outer lighting arrangements, and two third row lighting arrangements.

7. The aircraft head light according to claim 6, having at least one of the following features:
- for the adjacent pairs of first row lighting arrangements and second row outer lighting arrangements, the respective reflector contact sections of the generally parabolic reflectors of each of the two first row lighting arrangements are parabolic and the respective reflector contact sections of the generally parabolic reflectors of each of the two second row outer lighting arrangements are non-parabolic,
- for the adjacent pairs of first row lighting arrangements and second row center lighting arrangement, the respective reflector contact sections of the generally parabolic reflectors of each of the two first row lighting arrangements are parabolic and the respective reflector contact sections of the generally parabolic reflector of the second row center lighting arrangement are non-parabolic,
- for the adjacent pairs of second row outer lighting arrangements and third row lighting arrangements, the respective reflector contact sections of the generally parabolic reflectors of each of the two second row outer lighting arrangements are parabolic and the respective reflector contact sections of the generally parabolic reflectors of each of the two third row lighting arrangements are non-parabolic, and
- for the adjacent pairs of third row lighting arrangements and second row center lighting arrangement, the respective reflector contact sections of the generally parabolic reflector of the second row center lighting arrangement are parabolic and the respective reflector contact sections of the generally parabolic reflectors of each of the two third row lighting arrangements are non-parabolic.

8. The aircraft head light according to claim 1, wherein each of the light sources of the plurality of lighting arrangements comprises at least one LED.

9. The aircraft head light according to claim 1, wherein each of the plurality of lighting arrangements comprises a lens, with the generally parabolic reflector being arranged around the lens.

10. The aircraft head light according to claim 1, wherein the aircraft head light is one of a helicopter search light, an airplane landing light, an airplane taxi light, an airplane runway turnoff light, and an airplane take-off light.

11. A rotorcraft comprising an aircraft head light according to claim 1.

12. An airplane comprising an aircraft head light according to claim 1.

* * * * *